United States Patent
Ro

(10) Patent No.: US 8,729,744 B2
(45) Date of Patent: May 20, 2014

(54) INVERTER

(75) Inventor: Huntae Ro, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 571 days.

(21) Appl. No.: 13/064,143

(22) Filed: Mar. 8, 2011

(65) Prior Publication Data

US 2012/0007446 A1 Jan. 12, 2012

(30) Foreign Application Priority Data

Jul. 12, 2010 (KR) .................. 10-2010-0066893

(51) Int. Cl.
*H02J 7/00* (2006.01)

(52) U.S. Cl.
USPC .......................................... 307/150; 307/151

(58) Field of Classification Search
USPC ................................................. 307/150, 151
See application file for complete search history.

(56) References Cited

U.S. PATENT DOCUMENTS

| | | | |
|---|---|---|---|
| 6,037,746 A | 3/2000 | Sheng et al. | |
| 2004/0121225 A1* | 6/2004 | Krieger et al. | 429/96 |
| 2006/0061333 A1 | 3/2006 | Kranz | |
| 2007/0207377 A1 | 9/2007 | Han et al. | |
| 2008/0030170 A1* | 2/2008 | Dacquay et al. | 320/137 |

FOREIGN PATENT DOCUMENTS

| | | |
|---|---|---|
| GB | 2299559 A | 10/1996 |
| JP | 07-242152 A | 9/1995 |
| KR | 20-1984-0007881 U | 12/1984 |
| KR | 10 2006-0006822 A | 1/2006 |
| KR | 10-2006-0024066 A | 3/2006 |
| KR | 10 2007-0013253 A | 1/2007 |
| KR | 10 2007-0025391 A | 3/2007 |
| KR | 10 2009-0098778 A | 9/2009 |

OTHER PUBLICATIONS

KR Office Action dated Nov. 21, 2012.
Korean Office Action dated Jun. 1, 2012 for KR 10-2010-0066893. Huntae RO.

* cited by examiner

*Primary Examiner* — Robert L. Deberadinis
(74) *Attorney, Agent, or Firm* — Lee & Morse, P.C.

(57) ABSTRACT

Disclosed is an inverter that supplies power using a battery pack mounted on a mobile device. The inverter includes a case having a receiving part in which a battery pack is to be received, a control part disposed within the case to convert a voltage of the battery pack into a preset output voltage, and an external terminal disposed outside the case. The output voltage converted by the control part is output through the external terminal.

15 Claims, 4 Drawing Sheets

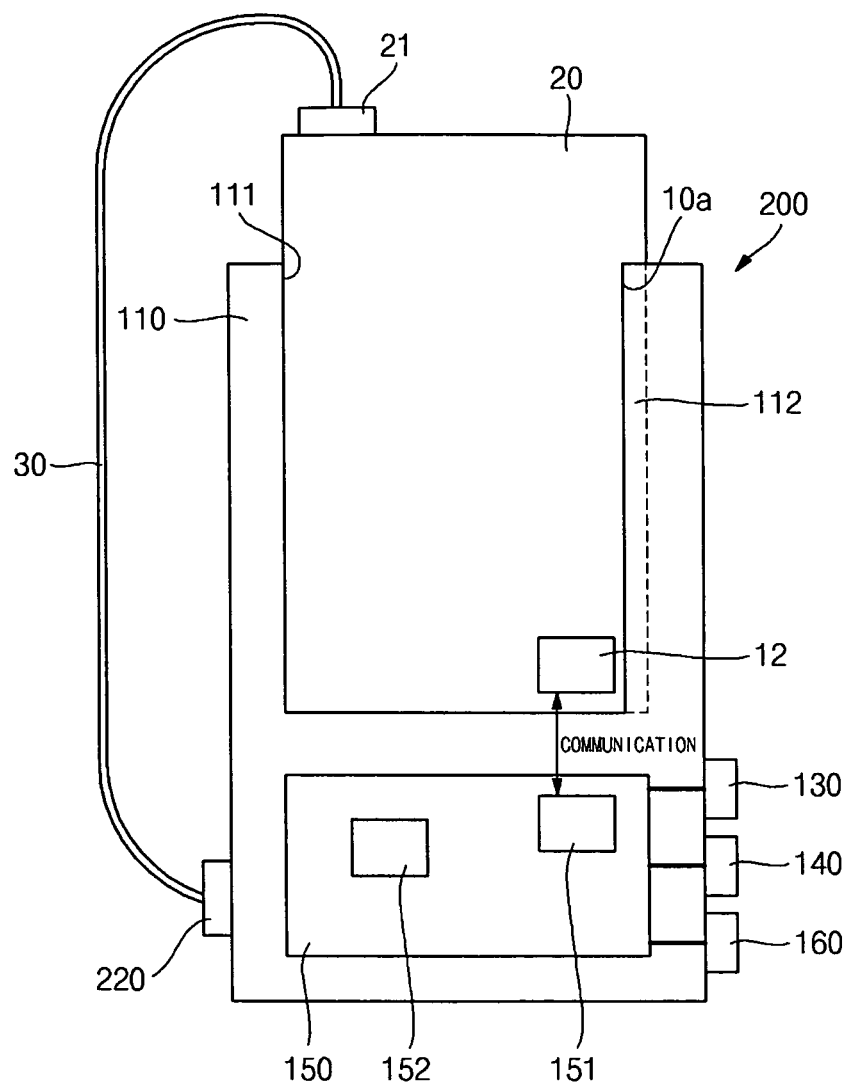

INVERTER

BACKGROUND

1. Field

Embodiments relate to an inverter.

2. Description of the Related Art

Currently, high-power battery packs using nonaqueous electrolyte with high-energy density are being developed. This type of high-power battery pack creates a large capacity battery pack by connecting a plurality of secondary batteries in series. Therefore, this high-power battery pack may be used for a power source of a device when high power is required, e.g., for driving a motor of an electric vehicle.

In addition, the battery pack may be used as a power source to drive or charge small appliances and portable electronic products. Thus, an inverter that converts energy charged in the battery pack into a user-desired output is required.

SUMMARY

Embodiments are therefore directed to an inverter, which substantially overcomes one or more of the problems due to the limitations and disadvantages of the related art.

It is therefore a feature of an embodiment to provide an inverter that converts energy charged into the battery pack into a user-desired output.

It is therefore another feature of an embodiment to provide an inverter that provides power using a battery pack mounted on a mobile device.

At least one of the above and other features and advantages may be realized by providing an inverter including: a case having a receiving part in which a battery pack is received; a control part disposed within the case to convert a voltage of the battery pack into a preset output voltage; and an external terminal electrically connected to the control part and disposed outside the case, wherein the output voltage converted by the control part is outputted through the external terminal.

A connection part electrically connecting the battery pack to the control part may be disposed in the receiving part.

A plug may be disposed at a lower portion of the battery pack, and the connection part may be directly coupled to the plug.

A connection part electrically connecting the battery pack to the control part may be disposed outside the case.

A plug may be disposed at an upper portion of the battery pack, and the connection part may be connected to the plug through a cable.

A guide may be disposed on a surface of the receiving part.

The battery pack may have a guide groove having a shape corresponding to that of the guide.

The inverter may further include a power selection part electrically connected to the control part to select AC power and DC power.

The inverter may further include a voltage selection part electrically connected to the control part to select an output voltage.

The battery pack may include a radio-frequency identification (RFID) transmitter, and the control part may include an RFID receiver communicating with the RFID transmitter.

The control part may further include a voltage detector configured to detect a voltage of the battery pack.

At least one of the above and other features and advantages may also be realized by providing a battery pack mounted on a mobile device.

The control part may convert DC voltage charged in the battery pack into AC voltage or DC voltage.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates a block diagram of an inverter according to another embodiment.

DETAILED DESCRIPTION

Figure 1A:
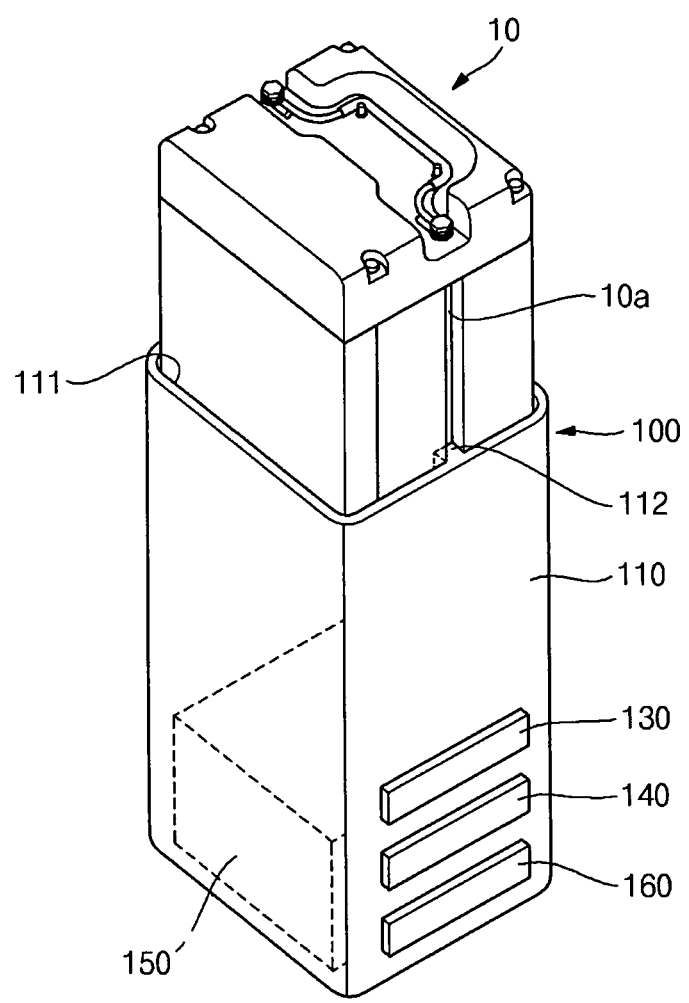
FIG. 1A illustrates a perspective view of an inverter according to an embodiment.

Korean Patent Application No. 10-2010-0066893 filed on Jul. 12, 2010, in the Korean Intellectual Property Office, and entitled: "INVERTER" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

An inverter 100 according to an embodiment converts power of a battery pack 10 into power required for a user using the battery pack 10 as a power source. The battery pack 10 is mounted on a mobile device. Here, the battery pack 10 may be a battery pack 10 used for an e-bike, but it is not limited thereto. That is, the battery pack 10 may be applicable to various battery packs mounted on the mobile device. For example, where power is required in an outdoor setting or during movement, the battery pack 10 is mounted on the inverter 100 to obtain desired power. The inverter 100 may provide AC 220V power that is commercial AC power and various DC powers from the battery pack 10. Also, the inverter 100 requires only a small space, i.e. enough to mount the battery pack 10. Thus, the inverter 100 is easily portable due to a small volume and lightweight.

Figure 1B:
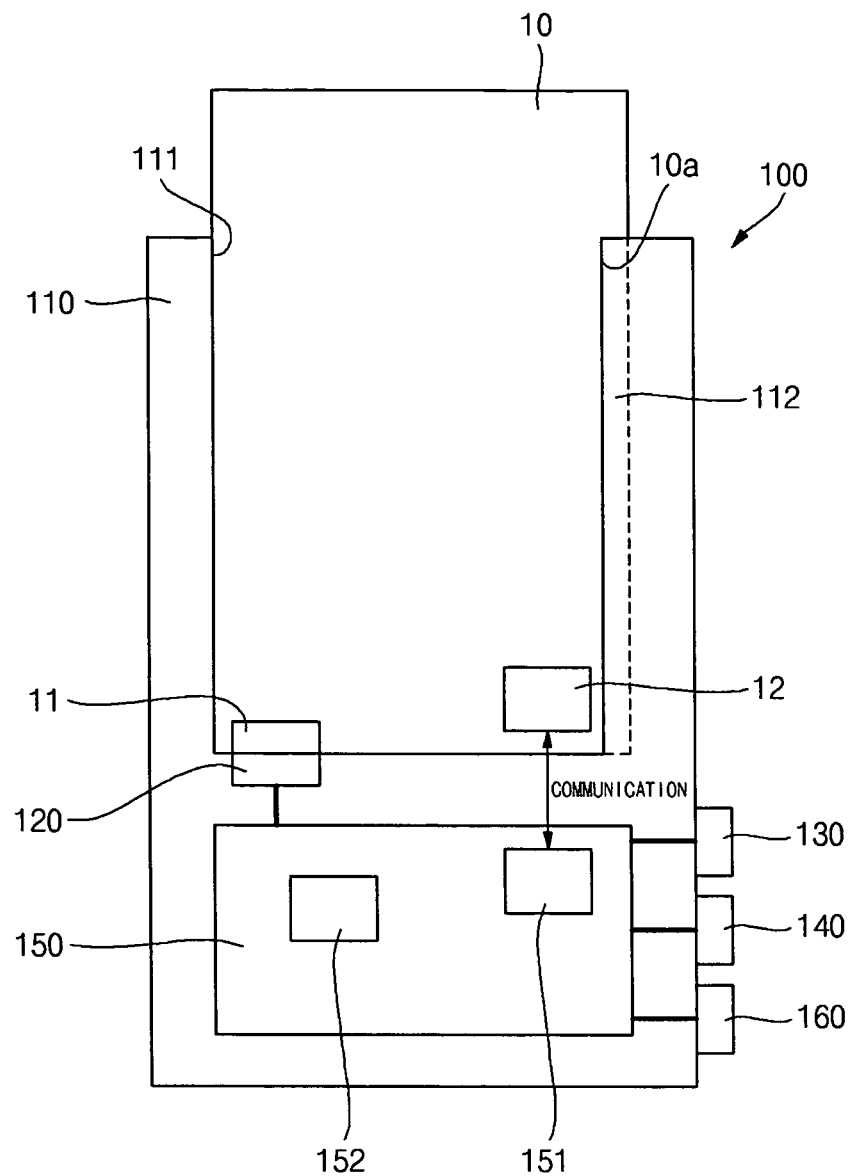
FIG. 1B illustrates a side profile view of an inverter according to an embodiment of FIG. 1A.
Figure 1C:
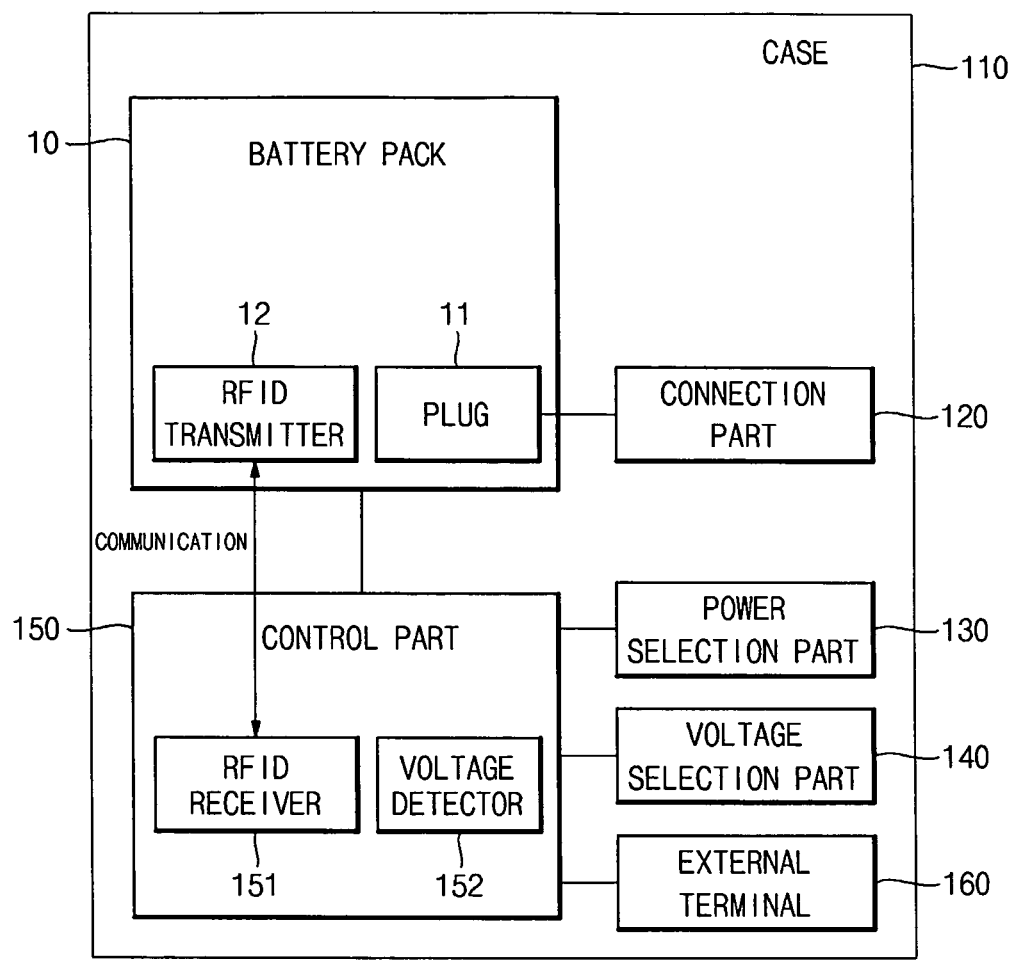
FIG. 1C illustrates a block diagram of an inverter according to an embodiment of FIG. 1B.

FIG. 1A illustrates a perspective view of an inverter according to an embodiment. FIG. 1B illustrates a side profile view of an inverter according to an embodiment of FIG. 1A. FIG. 1C illustrates a block diagram of an inverter according to an embodiment of FIG. 1B.

Referring to FIGS. 1A through 1C, the inverter 100, according to an embodiment, includes a case 110, a connection part 120, a control part 150, and an external terminal 160.

Also, the inverter 100, according to an embodiment, further includes a power selection part 130 and a voltage selection part 140, which are electrically connected to the control part 150.

The battery pack 10 mounted on the inverter 100 will be described below.

The battery pack 10 includes a plurality of battery cells, which are connected to each other. The plurality of battery cells is received into a housing. A positive electrode tab and a negative electrode tab of each of the battery cells are electrically connected to each other to constitute one battery pack 10. A handle may be disposed on the battery pack 10 to allow the user to easily grasp and transfer the battery pack 10.

A guide groove 10a is defined in a surface of the battery pack 10. The guide groove 10a is coupled to a guide 112 disposed on the inverter 100. That is, when the battery pack 10 is mounted on the inverter 100, the guide groove 10a is coupled to the guide 112 to allow the battery pack 10 to be mounted on the inverter 100 in position.

A plug 11 is disposed on a lower portion of the battery pack 10. An external device may be connected to the plug 11. The plug 11 is electrically connected to the position electrode tab and the negative electrode tab of the battery cell. Thus, the external device may be electrically connected to the battery cell through the plug 11. Here, the external device may be a charging device for charging the battery cell or a motor or portable electronic product driven using energy stored in the battery cell. The plug 11 may be disposed on the lower portion of the battery pack 10 and directly connected to the connection part 120 disposed on the inverter 100.

The battery pack 10 may include a radio-frequency identification (RFID) transmitter 12. Information of the battery pack 10 is transmitted to the inverter 100 through the RFID transmitter 12. The inverter 100 includes an RFID receiver 151 communicating with the RFID transmitter 12. The RFID transmitter 12 transmits the information of the battery pack 10, and the RFID receiver 151 recognizes the information transmitted from the RFID transmitter 12. Here, the information transmitted from the RFID transmitter 12 is used for identifying the battery pack 10. That is, the inverter 100 may confirm whether the battery pack 10 is mounted through the RFID communication.

The case 110 has an approximately rectangular shape. Also, the case 110 has a receiving part 111 therein. The battery pack 10 is received into the receiving part 111. Thus, the receiving part 111 may have the same size as that of the battery pack 10 to fix the battery pack 10 thereto. Also, the guide 112 is disposed on an inner surface of the case 110. The guide 112 protrudes from and is coupled to the guide groove 10a of the battery pack 10.

The connection part 120 is disposed within the case 110, i.e., a bottom surface of the receiving part 111, and is electrically connected to the plug 11 of the battery pack 10. The connection part 120 is disposed at a position corresponding to that of the plug 11. Thus, the connection part 120 may be directly connected to the battery pack 10 without using other connection units when the battery pack 10 is received into the receiving part 111. In addition, the connection part 120 may be an outlet having a shape corresponding to that of the plug 11. The connection part 120 is electrically connected to the control part 150.

The power selection part 130 is disposed outside the case 110. The power selection part 130 may be classified as an AC power source or a DC power source. The user may select the required power as necessary. For example, in case where the AC power is needed to drive small appliances, the user may select the AC power source. When the DC power is needed to drive MP3 players or portable multimedia players (PMPs), the user may select the DC power source.

The voltage selection part 140 is disposed outside the case 110, similar to the power selection part 130. The user may select a desired voltage through the voltage selection part 140.

When AC 220V power for driving the small appliances is required, the user may select the AC power source of the power selection part 130 and select 220V in the voltage selection part 140 to obtain the AC 220V power.

The control part 150 is disposed within the case 110 and is electrically connected to the connection part 120. The control part 150 converts the energy charged in the battery pack 10 into an output voltage desired by the user. That is, the control part 150 may convert the DC power charged in the battery pack 10 into AC power (DC->AC) or DC power (DC->DC).

The control part 150 is connected to the power selection part 130 and the voltage selection part 140, such that the control part 150 may receive voltage information necessary for the user. The control part 150 receives information selected in the power selection part 130 and the voltage selection part 140 to convert the DC power into an output voltage desired by the user. Thus, the user will be provided with the converted voltage. For example, when the AC 220V power is selected through the power selection part 130 and the voltage selection part 140, the control part 150 may convert the energy charged in the battery pack 10 into AC 220V power. The external terminal 160 may provide the converted power to the user.

The control part 150 includes the RFID receiver 151 and a voltage detector 152.

The RFID receiver 151 may receive information transmitted from the RFID transmitter 120 to identify whether the battery pack 10 is mounted. The RFID transmitter is disposed in the battery pack 10.

The voltage detector 152 detects a voltage of the battery pack 10. The voltage detector 152 intercepts a voltage output into the external terminal 160 when the battery pack 10 has a voltage less than a reference voltage. When the battery pack 10 has a voltage less than a reference voltage, the battery pack 10 may not continue to be used. The voltage detector 152 may generate an alarm when the voltage of the battery pack 10 is lower than the reference voltage. The battery pack 10 is mounted on the mobile device, so that the reference voltage may be set to a voltage high enough to drive the mobile device. The reference voltage may be set high enough to prevent the battery pack 10 from being completely discharged.

The external terminal 160 is electrically connected to the control port and is disposed outside the case 110. The external terminal 160 may be connected to the external device through the external terminal 160. Thus, an electronic product used by the user may be connected to the external terminal 160. The external terminal 160 may include a power cord, an USB input/output terminal, or a terminal having various shapes, but it is not limited thereto.

As described above, the inverter 100 according to an embodiment converts power charged in the battery pack 10 into power necessary for the user. The inverter 100 uses the battery pack 10 as a power source mounted on the mobile device.

An operation of the inverter 100 will be described below.

When power is required outdoors, indoors, inside a building, or during user movements, the user mounts the battery pack 10 into the receiving part 111 of the inverter 100. The plug 11 of the battery pack 10 is connected to the connection part 120 of the inverter 100, such that the battery pack 10 and the inverter 100 are electrically connected to each other. The user selects the AC or DC power and voltage through the power selection part 130 and the voltage selection part 140. The control part 150, receiving information from the power selection part 130 and the voltage selection part 140, converts energy charged in the battery pack 10 into power desired by the user. Thus, the control part 150 will output an output voltage through the external terminal 160. The user may then connect an electronic product to the external terminal 160 to use the electronic product.

According to an embodiment described above, the inverter 100 has small volume and is lightweight. Thus, the inverter 100 is easily portable.

The inverter 100, according to an embodiment, outputs necessary power for the user from the battery pack 10. The battery pack 10 is mounted on the mobile device as the power source. The inverter 100 may be used, e.g. outdoors or while moving.

The inverter 100, according to an embodiment, includes the power selection part 130, the voltage selection part 140, and the control part 150. The inverter 100 may output various types of power, such as AC power and DC power.

An inverter according to another embodiment will be described below.

FIG. 2 illustrates a block diagram of an inverter according to another embodiment.

An inverter 200, according to another embodiment, is similar to that inverter 100 of FIG. 1B. Thus, differences therebetween will be described.

According to another embodiment and referring to FIG. 2, the inverter 200 includes the case 110, a connection part 220, the control part 150, and the external terminal 160. The inverter 200 may further include the power selection part 130 and the voltage selection part 140, which are electrically connected to the control part 150.

A battery pack 20 mounted on the inverter 200 will be described below.

The battery pack 20 includes a plurality of battery cells, which are connected to each other. The plurality of battery cells is received into a housing. A positive electrode tab and a negative electrode tab of each of the battery cells are electrically connected to each other to constitute one battery pack 20. A handle may be disposed on the battery pack 20 to allow a user to easily grasp and transfer the battery pack 20.

A plug 21 is disposed on an upper portion of the battery pack 20. An external device may be connected to the plug 21. The plug 21 is electrically connected to the position electrode tab and the negative electrode tab of the battery cell. Thus, the external device may be electrically connected to the battery cell through the plug 21. The external device may be a charging device for charging the battery cell. The external device may also be a motor or portable electronic product driven using energy charged in the battery cell. The plug 21 may be disposed on an upper portion of the battery pack 20 and connected to the connection part 220 disposed on the inverter 200 through a cable 30.

The cable 30 electrically connects the battery pack 20 to the inverter 200. The cable 30 has one side connected to a plug 21 disposed on the battery pack 20 and the other side connected to the connection part 220 of the inverter 200. Energy charged in the battery pack 20 may be transmitted into the inverter 200 through the cable 30.

The connection part 220 is disposed outside the case 110 and electrically connected to the plug 21 of the battery pack 20. The connection part 220 is electrically connected to the plug 21 through the cable 30. In addition, the connection part 220 and the control part 150 are electrically connected to each other.

According to another embodiment described above, the inverter 200 has small volume and is lightweight. Thus, the inverter 200 is easily portable.

According to another embodiment, the inverter 200 outputs power necessary for the user using the battery pack 20. The battery pack 20 is mounted on the mobile device as a power source. Therefore, since the battery pack 20 is mounted on the mobile device, the inverter 200 may be used in the outdoors or during user movements.

According to another embodiment, the inverter 200 includes the power selection part 130, the voltage selection part 140, and the control part 150. The inverter 100 may output various types of power, such as AC power and DC power.

According to the embodiments, the inverter outputs the necessary power for the user using the battery pack. The battery pack is mounted on the mobile device as the power source. The inverter may be used in the outdoors or during user movements.

According to the embodiments, the inverter according the inverter has small volume and is lightweight. Thus, the inverter may be easily portable.

According to the embodiments, the inverter includes the power selection part, the voltage selection part, and the control part. The inverter may output various types of power, such as AC power and DC power.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An inverter, comprising:
a case having a receiving part in which a battery pack is to be received;
a control part disposed within the case to convert a voltage of the battery pack into a preset output voltage;
a connection part disposed in the receiving part at a bottom thereof, the connection part having a shape corresponding to a plug on a bottom of the battery pack and directly electrically connecting the battery pack to the control part; and
an external terminal electrically connected to the control part and disposed on the case,
wherein the preset output voltage converted by the control part is output through the external terminal.

2. The inverter as claimed in claim 1, further comprising a guide on a surface of the receiving part.

3. The inverter as claimed in claim 2, wherein the guide has a shape corresponding to a guide groove of the battery pack.

4. The inverter as claimed in claim 1, further comprising a power selection part electrically connected to the control part to select AC power or DC power.

5. The inverter as claimed in claim 1, further comprising a voltage selection part electrically connected to the control part to select an output voltage.

6. The inverter as claimed in claim 1, wherein the control part includes a radio-frequency identification (RFID) receiver for communicating with an RFID transmitter in the battery pack, the RFID receiver receiving information transmitted from the RFID transmitter to identify whether the battery pack is mounted in the inverter.

7. The inverter as claimed in claim 1, wherein the control part further comprises a voltage detector configured to detect a voltage of the battery pack.

8. The inverter as claimed in claim 7, wherein the voltage detector prevents the voltage of the battery pack from being used when the voltage of the battery pack is less than a reference voltage.

9. The inverter as claimed in claim 8, wherein the voltage detector generates an alarm when the voltage of the battery pack is less than a reference voltage.

10. The inverter as claimed in claim 1, wherein the battery pack is to be mounted on a mobile device.

11. The inverter as claimed in claim 1, wherein the control part converts DC voltage charged in the battery pack into AC voltage or DC voltage.

12. The inverter as claimed in claim 1, further comprising a power selection part disposed outside the case, the power selection part allowing a user to select a type of power to be supplied.

13. The inverter as claimed in claim 12, further comprising a voltage selection part disposed outside the case, the voltage selection part allowing a user to select a voltage to be supplied.

14. A system, comprising:
 a battery pack; and
 an inverter as claimed in claim 1.

15. A mobile device, comprising the system as claimed in claim 14.

* * * * *